(12) United States Patent
Oelpke et al.

(10) Patent No.: US 7,481,863 B2
(45) Date of Patent: Jan. 27, 2009

(54) AIR FILTER

(75) Inventors: Reinhard Oelpke, Harthausen (DE); Torsten Hotop, Pforzheim (DE)

(73) Assignee: Mann & Hummel GmbH, Ludwigshafen (DE)

( * ) Notice: Subject to any disclaimer, the term of this patent is extended or adjusted under 35 U.S.C. 154(b) by 448 days.

(21) Appl. No.: 11/296,505

(22) Filed: Dec. 8, 2005

(65) Prior Publication Data

US 2006/0123754 A1    Jun. 15, 2006

(30) Foreign Application Priority Data

Dec. 9, 2004    (DE) ................ 10 2004 059 279

(51) Int. Cl.
*B01D 46/00* (2006.01)
(52) U.S. Cl. ............... 55/521; 55/497; 55/498; 55/502; 55/483; 55/501; 55/508; 55/511; 55/513; 55/519; 55/520
(58) Field of Classification Search ............ 55/497, 55/498, 502, 483, 499, 501, 508, 511, 513, 55/519–521
See application file for complete search history.

(56) References Cited

U.S. PATENT DOCUMENTS

| | | | |
|---|---|---|---|
| 4,449,993 A | 5/1984 | Bergeron | |
| 5,304,312 A | 4/1994 | Forster et al. | |
| 5,304,351 A * | 4/1994 | Tanaka et al. | 422/180 |
| D437,402 S | 2/2001 | Gieseke et al. | |
| D439,963 S | 4/2001 | Gieseke et al. | |
| D450,827 S | 11/2001 | Gieseke et al. | |
| D484,584 S | 12/2003 | Anderson et al. | |
| 2002/0185008 A1 | 12/2002 | Anderson et al. | |
| 2003/0106432 A1 | 6/2003 | Gieseke et al. | |

(Continued)

FOREIGN PATENT DOCUMENTS

EP    0 581 695 B1    2/1994

(Continued)

OTHER PUBLICATIONS

European Search Report dated Mar. 22, 2006 including English Translation of relevant portion (Six (6) pages).

(Continued)

*Primary Examiner*—Jason M Greene
*Assistant Examiner*—Minh-Chau T Pham
(74) *Attorney, Agent, or Firm*—Crowell & Moring LLP

(57) ABSTRACT

An axial flow filter element having alternating flat and pleated layers of fluid permeable filter media which form channels with an open cross section, one end of a first group of channels and the other end of a second group of channels being tightly sealed such that fluid being filtered must pass through one of the filter layers to pass through the filter element, a peripheral seal for sealing the inflow side of the filter from the outflow side in a housing, and a support body arranged in the filter element surrounded by the channels and extending axially at least to one end face of the filter element; at least one end face of the filter element having a spacer for maintaining the end face at a distance from a supporting surface on which the filter element may be placed during handling to prevent direct contact between the end face and the supporting surface.

12 Claims, 2 Drawing Sheets

U.S. PATENT DOCUMENTS

2003/0182909 A1* 10/2003 Gieseke et al. ............. 55/385.3
2003/0217534 A1   11/2003 Krisko et al.
2005/0022484 A1   2/2005  Krisko et al.
2005/0166561 A1*  8/2005  Schrage et al. ................ 55/498
2007/0169449 A1*  7/2007  Merritt ........................ 55/486
2007/0186528 A1*  8/2007  Wydeven et al. .............. 55/498
2007/0193236 A1*  8/2007  Merritt ........................ 55/498
2007/0271886 A1* 11/2007  Rieger et al. .................. 55/486

FOREIGN PATENT DOCUMENTS

WO    WO 02/098540 A1    12/2002

OTHER PUBLICATIONS

German Search Report dated Aug. 23, 2007 w/English translation of pertinent portions (eight (8) pages).

* cited by examiner

AIR FILTER

BACKGROUND OF THE INVENTION

The invention relates to a filter element for a fluid stream which flows into an axial end face of the filter element.

Axial flow filter elements are used in many areas where a gas or liquid must be filtered. These elements are used in all types of housings and must be replaced or cleaned as intended after specified maintenance intervals or after reaching a certain contaminant load level. It is therefore of crucial importance that it be possible to manipulate or handle the filter element because a filter element that is difficult to handle may not be cleaned or replaced at all, or the element or system may be damaged in an attempt to handle it using improper tools.

U.S. Pat. No. 6,235,195 (=EP 1,169,109) discloses an axial flow filter element, with oncoming flow at one end and outgoing flow from the opposite end without any deflection of the fluid flow. In this filter a handle is provided extending axially from the first end face and permanently connected to the filter element—preferably to the inner core of the filter element. This handle extends a sufficient distance from the end face of the filter element that problem-free handling by hand without the use of tools is possible. During the manufacturing process and/or during maintenance, such filter elements are sometimes set down on the floor or ground or on a work surface, in which case the clean end comes to rest directly on the contact surface. Especially in the case of large-volume filter elements having a certain weight and/or a large outside diameter, it may be impossible to avoid setting the filter down temporarily. Then foreign bodies may be forced into the sensitive clean end of the filter element because the surface on which the filter is placed is unclean. The channel structures of the filter element, which are sealed at alternating ends, consequently become damaged, while on the other hand the foreign bodies such as metal shavings or loose screws and nuts may be drawn into the machine assembly, such as an internal combustion engine or compressor, which should actually be protected by the filter element. This results in increased wear or even damage to the machine assembly, which must be avoided.

SUMMARY OF THE INVENTION

It is therefore an object of the present invention to provide an improved axial flow filter element.

Another object of the invention is to provide an axial flow filter element which can be readily handled in a safe manner, preferably without the use of tools, and which is simple and inexpensive to manufacture.

A further object of the invention is to provide an axial flow filter element which can be safely handled and even set down during handling without damage to or contamination of the clean side of the filter.

These and other objects are achieved in accordance with the present invention by providing an axial flow filter element for a fluid stream comprising alternating flat and pleated layers of fluid-permeable filter media which form parallel channels with an open cross section extending from one axial end face of the filter element to the other, a first group of the channels being sealed at one end and a second group of the channels surrounding the individual channels of the first group being sealed at the other end such that a fluid to be filtered entering the filter element through one axial end face must pass though a layer of the filter media to traverse the filter element and exit through the other axial end face; a peripheral seal for sealing an inflow side of the filter element from a discharge side in a filter housing, and a support body arranged in the filter element surrounded by the channels and extending axially to at least one end face of the filter element, wherein at least one end face of the filter element is provided with at least one spacer for maintaining the end face of the filter element spaced a distance from a support surface such that direct contact between the end face and the support surface is prevented.

The fluid filter element according to the invention for oncoming flow at the end face comprises an axial flow filter medium, means for sealing the oncoming flow end from the outgoing flow end of the filter element on the outside of the filter medium, and at least one supporting body situated centrally in the filter element. The filter medium in this case comprises alternating flat and pleated filter layers, the flat layer being arranged in alternation with the pleated layer, resulting in channels having an open cross section, in particular a triangular cross section. The resulting channels are then alternately sealed off at the end, so that in passing from the oncoming flow side formed by one end face of the filter element to the outgoing flow side formed by the opposite end face, the fluid to be filtered must pass through one of the aforementioned layers intended for filtering the fluid.

The supporting body is arranged centrally in the filter medium in this design and is thus surrounded by the channels and extends axially essentially up to at least one first end face of the filter element. The layers of the filter medium are preferably made of a filter paper, but may also be made, for example, of a fully synthetic medium, in which case the pleated layer would have to be supported by impregnation of the fully synthetic medium. The filter element may have an angular, round, elliptical or oval cross section or shape, but it is preferably round at the outer edges and constructed in the form of an oval between the outer edges. The supporting body, which is disposed centrally in the filter element, is preferably produced by injection molding, but it may also be made of a material other than synthetic resin and/or produced by a different manufacturing process. The two end faces of the supporting body preferably extend to the corresponding end faces of the filter medium.

The effect of having alternate sealing of the flow channels is that through a clever arrangement the complete area of the surrounding filter medium of the first oncoming flow channels on the oncoming flow end can have flow passing through it to arrive at the second channels on the outgoing flow end. The only exceptions to this are the outermost channels.

At least one of the end faces of the filter element is provided with spacers for maintaining the end face at a distance from a supporting surface on which the filter element may be placed during handling. These spacers prevent direct surface contact between the end face and the supporting surface. Since surface contact is prevented, the filter element may be placed on an unclean supporting surface while being serviced. Metal shavings, nuts or other foreign bodies on the supporting surface then cannot be pressed into the filter medium of the filter element on that end face, thereby preventing damage to the filter element.

The preferred arrangement of the spacers on the clean side of the filter element thus also prevents release of foreign bodies to the machine assembly protected by the filter. The machine assembly may be, for example, an internal combustion engine or a compressor. Through a suitable choice of a spacers, distances suitable for the circumstances can be established between the end face of the filter element and the supporting surface. The spacers may be detachably or permanently connected to the filter element, but in any event unintentional release of the spacers must be prevented. The filter element according to the invention thus allows rapid and simple handling of the filter element without requiring any special precautions with regard to the substrate of a supporting surface, regardless of the type.

In accordance with one advantageous embodiment of the invention, the spacers comprise at least one profile element permanently attached to the filter medium on the end face of the filter element. As a result of this profile element, the end face of the filter element is maintained at a predetermined distance from a supporting surface upon which the filter element is set down. In addition, due to the use of the profile element, the end face of the filter element is kept essentially parallel with a supporting surface upon which the filter is placed. The profile element may comprise, for example, one or more interconnected or detached spacer strips, which may be made of plastic, metal or any other material having dimensional stability and are preferably permanently attached to the end face of the filter element. The attachment may be achieved, for example, via a welded connection or through an adhesive bond.

The profile element used may be constructed in the form of a rod having a round, angular or oval cross-section, or it could be constructed in the form of a sphere, cone or truncated cone. Ultimately, any possible shape that ensures a distance between the filter element and the supporting surface could be used. This explicitly includes a combination of the aforementioned parts to form a three-dimensional profile, for example a profiled rod having additional individually formed spacer elements. Through the use of such profiles, a simple individual adaptation to the shape and size of the filter element is possible, so that the desired results can be achieved in a simple and inexpensive manner.

Thus, for example, a profile may be arranged in an advantageous manner on opposite sides of the end face. The profiles may advantageously be formed by spacer strips joined together to form a structure. Each spacer strip preferably follows the contour of the respective side of the end face and is preferably also connected to other spacer strips running in the direction of the supporting body. This essentially symmetrical arrangement of profiles results in a good base for setting down the filter element, which ensures a particularly high level of safety in standing.

One alternative is to affix the spacers detachably or permanently to the supporting body. The attachment may be achieved, for example, via a clip connection, a screw-on connection, an adhesive bond and/or a welded joint. The connection of the spacers to the support body results in the end face of the filter element being kept essentially parallel to the supporting surface while also maintaining a predetermined distance between the end face and the supporting surface when the filter element is set down on the supporting surface.

The spacers in this case preferably comprise a plurality of spacer strips which are connected to the supporting body and extend parallel to the end face of the filter element in various directions away from the supporting body. These spacer strips may be the same as the spacer strips described above. In addition, due to a preferably uniform extent of the spacer strips extending away from the supporting body, the result is that the filter element stands securely and safely. When using three or four spacer strips, for example, an extremely low pressure drop due to the spacer strips is made possible.

In an alternative embodiment, the spacer is formed by a buckling-resistant lateral strip extending at least partially around the end face. In this embodiment, a lower part of the lateral strip is attached to part of the outer lateral surface of the filter element and an upper part of the lateral strip is protrudes axially beyond the end face of the filter element. The magnitude of the distance maintained between the filter element and the supporting surface is thus determined by the length of the upper part that protrudes axially above the end face of the filter element. The lateral strip in this embodiment is preferably made of a synthetic resin material (i.e. plastic), but metal or other buckling-resistant materials that may be converted into the form of a flat strip may also be used. This arrangement is doubly advantageous in that it both protects the end face of the filter element by keeping it at a distance from a possible supporting surface and also protects the end of the outer lateral surface of the filter element which otherwise would be exposed to an increased risk of damage due to a possible impact during handling of the filter element.

In accordance with an advantageous embodiment of the present invention, the lateral strip has a smaller diameter at the free end of the upper part than it does at its lower part which is connected to the lateral surface of the filter element. This results in the advantage that when a filter element constructed in this way is being handled, it is more easily introduced into an opening in its associated housing because a type of insertion ramp is created due to the change in diameter. The lateral strip may be attached to the lateral surface of the filter element, for example, via an adhesive bond or a welded joint, or also by detachable types of fasteners.

In accordance with yet another alternative embodiment of the invention, the spacer comprises a covering medium which covers the entire end face and is detachably joined to the end face. This covering medium may, for example, comprise a plastic film that is so strong and load bearing that foreign particles such as screws or metal shavings situated on a support surface cannot penetrate through it and therefore cannot damage the end face of the filter element. In addition, the covering medium may also be comprised of paper, cardboard, metal or other dimensionally stable materials that meet the prerequisites given above. The covering medium then preferably forms a peripheral edge which is turned up at least partially around the lateral surface of the filter element to form an edge guard for the lateral surface adjacent the end face.

It is advantageous if the covering medium is operatively connected to a device for signaling the covered state of the filter medium. The signaling may be visual, tactile or audible such that a signal is definitely transmitted to a person handling the filter element to indicate that the covering medium attached to the end face is still attached to the filter element. This should prevent mistakes in operation. Conceivable examples of such an embodiment include, for example, a colored signal strip connected to the covering medium that starting from the covering medium also surrounds the second end face, or a film which starts from the covering medium and has a rough surface such that the desired signaling effect is immediately perceived by a person handling the filter during the handling.

It is especially advantageous if the signaling is recognizable even when the filter element has been installed. To do so, the signaling element must be recognizable beyond a gasket applied to the lateral surface of the filter element in order to still exert a signaling effect even after the filter element has been introduced into its housing.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
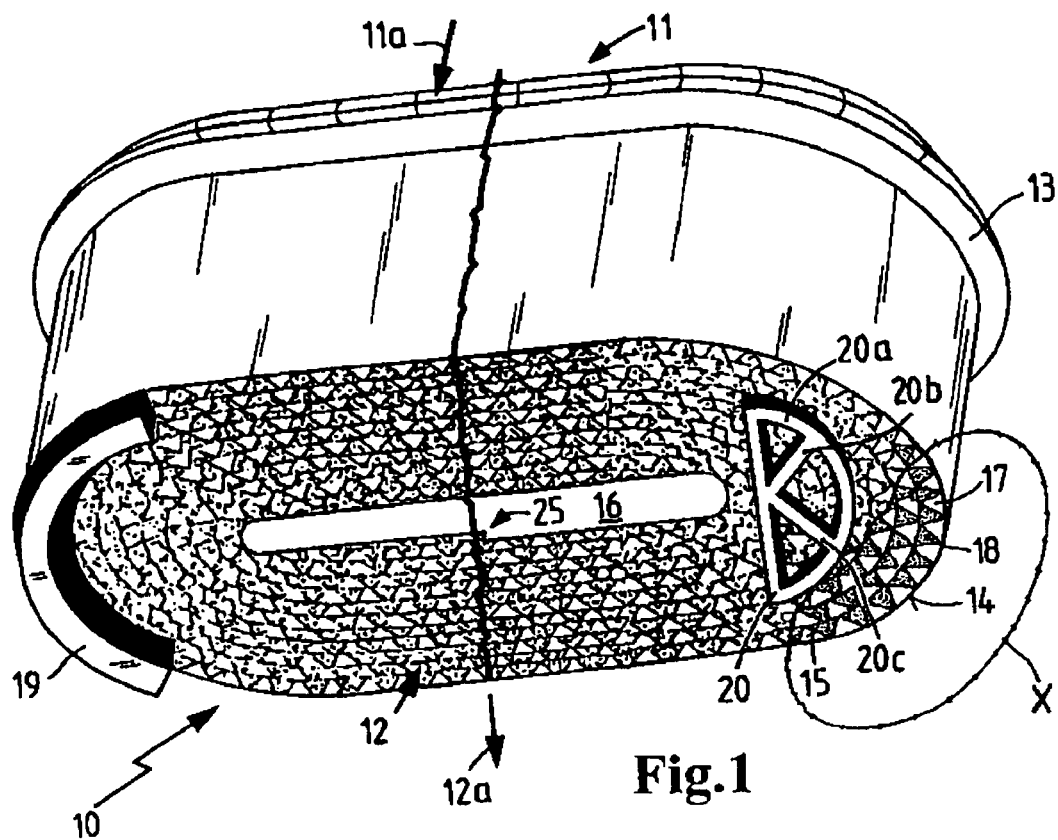
FIG. 1 is a schematic perspective view of a filter according to the present invention in a two-part form.

FIG. 1 shows a filter element 10 for general use for filtering gaseous fluids. Filter element 10 may be used, for example, in compressors, but it may also be used equally well in the mobile devices wherever it is necessary to filter an airstream. The fluid to be filtered flows axially through the filter element 10, with the first end face forming the inlet or unfiltered side 11 and the second end face forming the outlet or clean side 12. The filter element 10 has a peripheral gasket 13 arranged in the area of the first end face of the filter element 10 to provide a seal between the unfiltered side and the clean side of the filter. This gasket contacts supporting sealing surfaces inside a housing (not shown) and thus ensures a seal between the unfiltered and the clean side across the filter element 10.

Filter element 10 is made of alternating flat filter layers 14 and pleated filter layers 15, with the layers being coiled around a supporting body 16 disposed centrally in the filter element 10. Due to the alternating flat layers 14 and pleated layers 15, the winding of the layers around the supporting body 16 produces a channel structure, which leads to alternately open channels 17 and closed channels 18 due to the use of an adhesive. Accordingly, in its passage through the filter element 10 the air or other fluid to be filtered must first enter one of the open channels 17, then in the course of the channel it must pass through either the flat filter layer 14 or the pleated filter layer 15 so that it can exit the other side of the filter element 10 again from an adjoining channel. This means that each channel that is open on the first end face must be closed at its second end face and that the surrounding adjacent channels must be open and closed in an alternating manner.

In the lower area of the supporting body 16 there is a stop edge 25 which extends axially through the entire supporting body 16 up to the upper end face. The first layer of the filter medium, consisting of a flat layer 14 and a pleated layer 15, to be coiled onto the supporting body is placed abutting the stop edge 25 of the supporting body 16, where it is glued by application of glue and then coiled around the supporting body starting from that point to form a clockwise coil. The open channels 17 and closed channels 18 described above, as well as the flat filter layers 14 and the pleated filter layers 15, are depicted in greater detail in the detailed view area X.

In this figure, the filter element 10 is shown in two parts, each of which is provided with a different embodiment of spacer for maintaining the end face of the filter element 10 spaced a distance from a supporting surface on which the filter element may be temporarily placed during handling. On the left side, a spacer strip 19 is provided on the end face. It is permanently attached to the end face by spot gluing or continuous gluing. The spacer strip is preferably made of a thermoplastic material by an injection molding process. However, it is also conceivable to use other materials here. As shown in the drawing, the contour of the spacer strip 19 essentially follows a portion of the exterior contour of the end face of the filter element 10, but it is to be understood that the spacer strip 19 may be situated in any position on the end face.

On the right side, the spacer is formed by a combination of profiled rods 20, 20a, 20b, 20c, which profiled rods are constructed to be lighter and smaller than the spacer strip 19 shown on the left side of the figure. Stable support is achieved in this embodiment through the combination of profiled rods 20, 20a, 20b, 20c. Here again, individual points on the profiled structure 20, 20a, 20b, 20c are preferably provided with an adhesive, but a sufficiently tight bond to the end face of the filter element 10 is nevertheless established. The spacer embodiments shown on the left and right sides of FIG. 1 are preferably each used in mirror image pairs to ensure secure support and maintenance of adequate spacing from the supporting surface.

Figure 2:
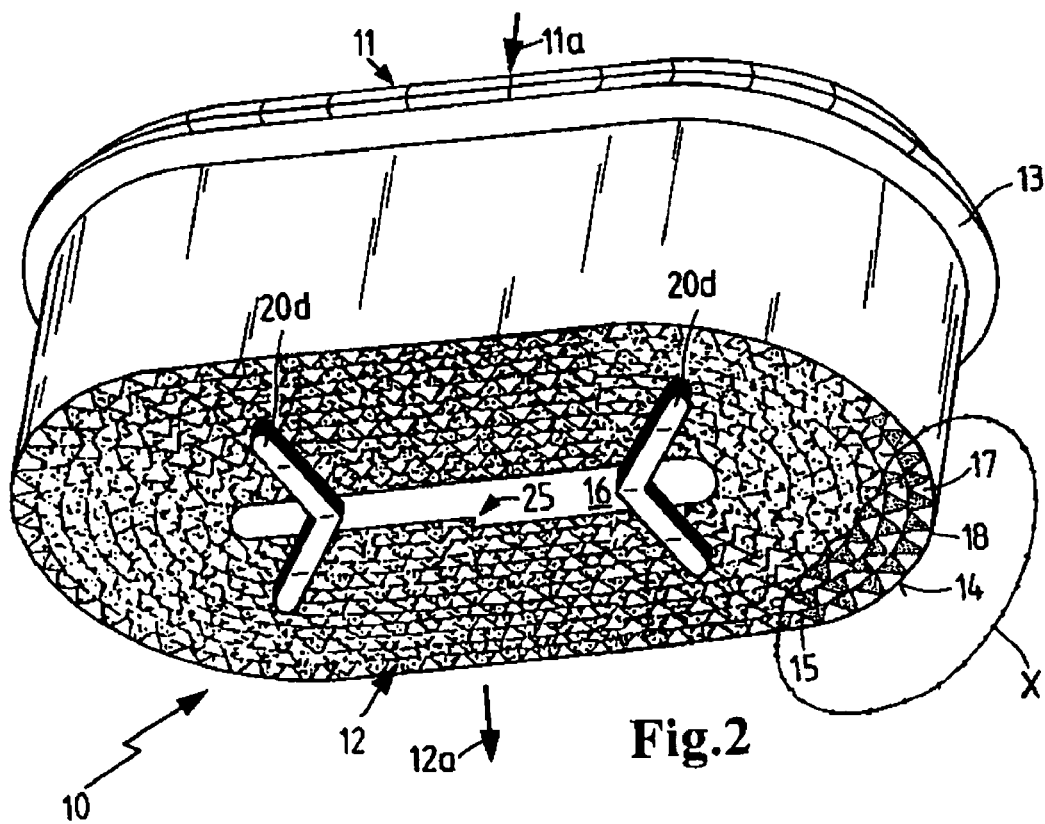
FIGS. 2 through 4 are each schematic perspective views of alternative embodiments of the filter according to the invention.

FIG. 2 shows an alternative embodiment of the invention. In this figure, parts corresponding to those shown in FIG. 1 are identified by the same reference numerals. In the embodiment of FIG. 2, the profiled rods 20 are each arranged at an angle and attached to the supporting body 16. The connection between the rods 20 and supporting body 16 may be a releasable one, for example, a clip connection or screw-on connection, or a permanent one, for example, a adhesive bond or a welded joint. Here again the profiled rods are preferably made of a thermoplastic material suitable for molding by the injection molding process, but other materials such as metals, laminated materials, etc. may also be used. The paired symmetrical arrangement shown here results in a stable support and an essentially parallel spacing of the end face of the filter element 10 from a supporting surface on which the filter element by be set down during handling.

The spacer strip 19 or the profile rods 20, 20a, 20b, 20c may be connected by an adhesive bond as follows: During the manufacturing process, the coiled filter assembly must be placed on a base plate of a casting shell to allow foaming of the gasket, which is preferably made of polyurethane resin foam, arranged on the first end face. Then grooves having the contour of the profiled rods or the spacer strip can be cut in the base plate, in which case the profiled rods or the spacer strip can then be inserted into the milled grooves, and in the next step the grooves are filled with adhesive and then joined to the filter assembly or the supporting body 16. While the gasket is being foamed and then subsequently cured, the adhesive bond of the spacer strips and/or profiled rods is also drying. In this way, the attachment of the spacers to the filter assembly results only an insignificant extension of the cycle time required for manufacturing the complete filter element 10.

Figure 3:
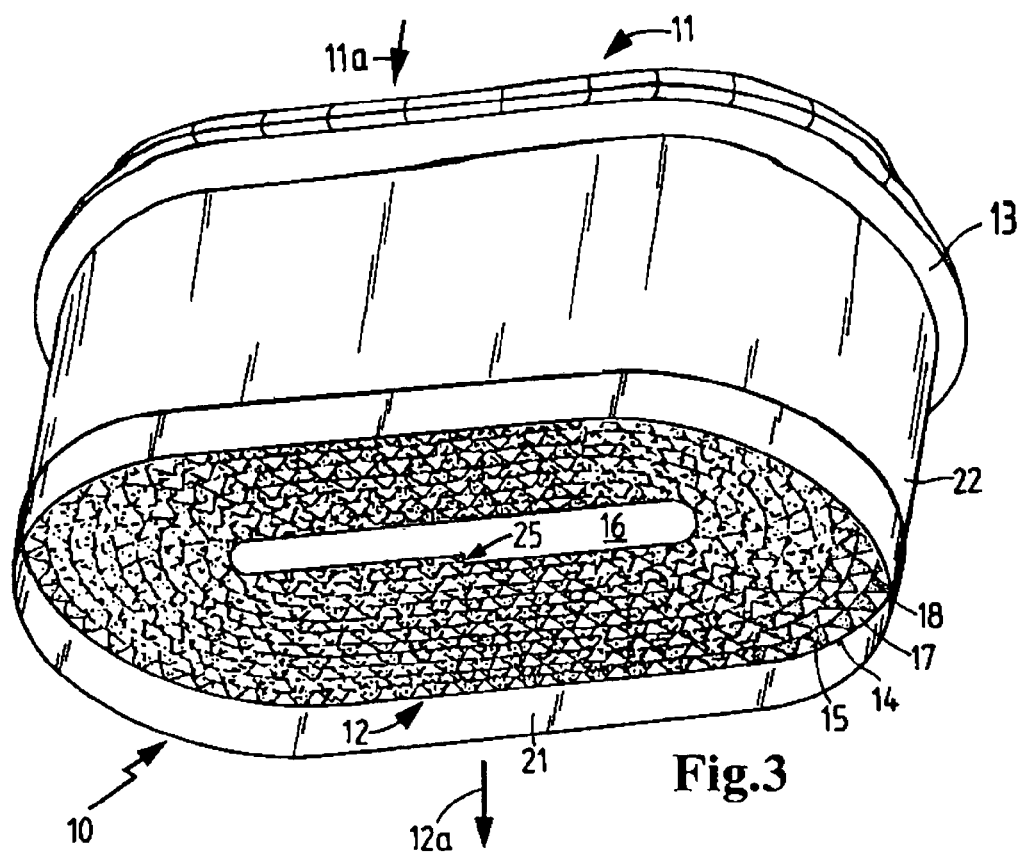

FIG. 3 shows another alternative embodiment of the spacer. Again, parts corresponding to those shown in the previous figures are identified by the same reference numerals. In this embodiment, a buckling-resistant or collapse-resistant, axially-projecting lateral strip 21 is attached to a lateral surface 22 of the filter element 10. This results in double protection for the filter element 10. First, the sensitive end face surface of the filter element 10 is protected, and second, the peripheral edge of the end face is protected from damage due to possible lateral impacts. The buckling-resistant or collapse-resistant lateral strip 21 is preferably made of a plastic strip or a metal strip, but other buckling-resistant materials are also conceivable. The lateral strip 21 is preferably permanently attached to the end part of the lateral surface 22 by an adhesive bond or by a welded joint. A portion of the buckling-resistant lateral strip protrudes axially beyond the end face of the filter element 10. The spacing distance of the filter end face from the supporting surface is determined by the height of this protruding part. The best protection for the end edge is obtained when the lateral surface 22 is surrounded completely by the buckling-resistant lateral strip, but it is also possible to apply the buckling-resistant lateral strip only partially to the lateral surface 22.

Figure 4:
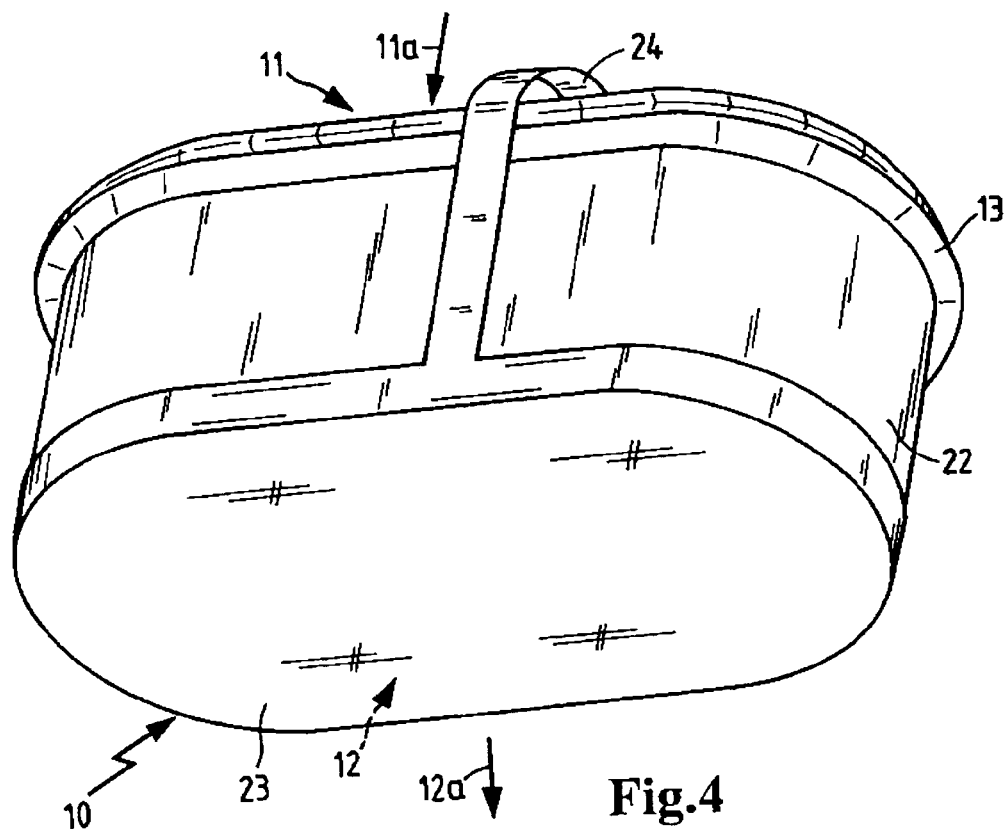

FIG. 4 shows an additional alternative embodiment of the present invention. Again, parts corresponding to those shown in the previous figures are identified by the same reference numerals. In this case, the entire axial end is covered by a cover 23 that extends over the entire end face and over a portion of the lateral surface 22. Cover 23 is preferably made of synthetic resin material or of metal. The strength of the material should be selected so that any foreign bodies on the supporting surface cannot be pressed into or through the material and thereby damage the end face of the filter.

Before the filter element 10 is used, the cover 23 must be removed. To make it visually apparent that the cover 23 is still present on the filter element 10, a strap 24 is attached to the cover. Strap 24 extends from the part of the cover 23 surrounding the lateral surface 22 at least up to the opposite end face of the filter element 10, or it is possible for the strap to extend as far as the other side of the cover 23. Therefore, when the filter element 10 is used, it can be readily discerned from any viewing direction that the cover 23 is still attached to the filter element 10. The strap 24 in this embodiment is preferably executed in a signal color so that even under unfavorable visual conditions, the removal of the cover 23 before use of the filter element 10 cannot be overlooked. The strap 24 may preferably be made of a film material that is easily torn.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. An axial flow filter element for a fluid stream comprising alternating flat and pleated layers of fluid-permeable filter media which form parallel channels with an open cross section extending from one axial end face of the filter element to the other, a first group of said channels being sealed at one end and a second group of said channels surrounding the individual channels of the first group being sealed at the other end such that a fluid to be filtered entering the filter element through one axial end face must pass though a layer of the filter media to traverse the filter element and exit through the other axial end face; a peripheral seal for sealing an inflow side of the filter element from a discharge side in a filter housing, and a support body arranged in the filter element surrounded by the channels and extending axially to at least one end face of the filter element, wherein at least one end face of the filter element is provided with at least one spacer for maintaining the end face of the filter element spaced a distance from a support surface such that direct contact between the end face and the support surface is prevented.

2. A fluid filter according to claim 1, wherein each channel of the first group except for those at the periphery of the filter element is surrounded by adjacent channels of the second group so that fluid to be filtered can flow through essentially the total surface area of the channels of the first group except for pleat edges of the channels.

3. A filter element according to claim 1, wherein the at least one spacer comprises a profile which is permanently attached to the filter medium on the end face of the filter element such that, when the filter element is placed on a support surface, the profile holds the end face of the filter element essentially parallel to the support surface and maintains a predetermined distance between the end face of the filter element and the support surface.

4. A filter element according to claim 3, wherein two profiles formed by spacer strips that are joined together to form a structure, are arranged on opposite sides of the end face.

5. A filter element according to claim 1, wherein the at least one spacer is attached to the support body such that when the filter element is placed on a support surface, the spacer holds the end face of the filter element essentially parallel to the support surface and maintains a predetermined distance between the end face of the filter element and the support surface.

6. A filter element according to claim 5, wherein the at least one spacer is permanently attached to the support body.

7. A filter element according to claim 5, wherein the at least one spacer comprises a plurality of spacer strips connected to the support body which extend parallel to the end face of the filter element and extend in various directions away from the support body.

8. A filter element according to claim 1, wherein the at least one spacer is formed by a collapse-resistant lateral strip that extends at least partially around the end face of the filter element, wherein a lower part of the lateral strip is attached to the outer lateral surface of the filter element and an upper part of the lateral strip protrudes axially beyond the end face of the filter element.

9. A filter element according to claim 8, wherein the protruding part of the lateral strip has a free end with a smaller diameter than the part of the lateral strip which is attached to the lateral surface of the filter element.

10. A filter element according to claim 1, wherein the spacer comprises a detachable cover which covers the entire end face of the filter element.

11. A filter element according to claim 10, wherein the cover is operatively connected to a signaling device for indicating the presence of the cover on the filter element.

12. A filter element according to claim 11, wherein the signaling device provides an indication which is perceptible even when the filter element is installed in a filter housing.

\* \* \* \* \*